(12) United States Patent
Williams et al.

(10) Patent No.: US 8,769,673 B2
(45) Date of Patent: Jul. 1, 2014

(54) IDENTIFYING POTENTIALLY OFFENDING CONTENT USING ASSOCIATIONS

(75) Inventors: Jeffrey S. Williams, Seattle, WA (US); Ronald A. Franczyk, Kirkland, WA (US); Tony Lee, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1034 days.

(21) Appl. No.: 11/680,324

(22) Filed: Feb. 28, 2007

(65) Prior Publication Data

US 2008/0209552 A1 Aug. 28, 2008

(51) Int. Cl.
*G06F 11/00* (2006.01)
*G06F 21/31* (2013.01)
*G06F 21/62* (2013.01)
*H04L 29/06* (2006.01)

(52) U.S. Cl.
CPC ............ *G06F 21/31* (2013.01); *G06F 21/6218* (2013.01); *H04L 63/145* (2013.01); *G06F 2221/2149* (2013.01)
USPC .............................................. 726/22; 726/23

(58) Field of Classification Search
CPC .................................................... H04L 63/145
See application file for complete search history.

(56) References Cited

U.S. PATENT DOCUMENTS

| | | | |
|---|---|---|---|
| 2005/0015626 A1* | 1/2005 | Chasin | 713/201 |
| 2005/0132069 A1* | 6/2005 | Shannon et al. | 709/228 |
| 2006/0075494 A1* | 4/2006 | Bertman et al. | 726/22 |
| 2006/0095404 A1* | 5/2006 | Adelman et al. | 707/3 |
| 2006/0253458 A1* | 11/2006 | Dixon et al. | 707/10 |
| 2007/0214151 A1* | 9/2007 | Thomas et al. | 707/10 |
| 2008/0028469 A1* | 1/2008 | Repasi et al. | 726/24 |
| 2008/0133540 A1* | 6/2008 | Hubbard et al. | 707/10 |
| 2009/0144826 A2* | 6/2009 | Piccard | 726/24 |

* cited by examiner

*Primary Examiner* — Jeffrey Pwu
*Assistant Examiner* — Nega Woldemariam
(74) *Attorney, Agent, or Firm* — Henry Gabryjelski; Sade Fashokun; Micky Minhas (57) ABSTRACT

Methods for identifying potentially harmful, malicious, or unwanted content based upon associations with known offenders are provided. Executable content associated with a domain is identified. The executable content URL and the domain are compared to URLs/domains known to be associated with malicious content. If the URL and/or the domain has been identified as associated with offending code, the remaining domain contents and any available associated information are examined to identify any referencing domains, referenced domains, linking domains, affiliated entities, etc. Each identified domain, affiliate, etc. is subsequently examined in a similar manner to identify any domain, entity, etc. having an association with malicious content. Each identified domain, entity, etc. is assigned a suspicion level based upon proximity to the source of the offending code. If desired, relationships among the domains, entities, and the like may be relationally mapped to render associations easier to identify.

12 Claims, 4 Drawing Sheets

IDENTIFYING POTENTIALLY OFFENDING CONTENT USING ASSOCIATIONS

BACKGROUND

Malware, or malicious code that may be utilized to infect computing systems and/or compromise the way that they work, is evolving as a class of software. In response to the rapid growth of this type of software, anti-malware solutions have been developed that are designed to mitigate the damaging effects to a computing system exposed to malware and/or other harmful or unwanted content. However, current anti-malware solutions are primarily reactive. That is, no matter how proficient a solution is at mitigating harmful effects, current solutions are unable to adequately detect malware before it causes actual harm. Further, most anti-malware solutions are rather time consuming processes as a significant amount of manual research is involved. Accordingly, once content is identified as harmful, malicious, or unwanted, and/or a malevolent web site or entity is identified, computing system users may be exposed to additional hours or days of risk before an adequate blocking of the harmful content is effected. Additionally, identification of harmful, malicious, or unwanted content in association with a particular web site does not in and of itself solve the problem as the offending entity may simply associate a different harmful, malicious, or unwanted content item that is not yet known to be harmful with the web site.

For an anti-malware solution to be optimized, new malware and new web sites distributing malware (and other harmful or unwanted content) must be identified in as close to real-time as possible, ideally before a large number of computing devices become infected. Current anti-malware solutions are simply unable to identify harmful, malicious, or unwanted content in a timely-enough fashion.

BRIEF SUMMARY

Embodiments of the present invention relate to systems, methods, and computer-readable media for identifying potentially harmful, malicious, or unwanted content based upon associations with known offending content and/or offending entities. Such associations may include, without limitation, associations with known malicious binaries, associations with known malevolent domains, associations with individuals and/or entities responsible for the content associated with known malevolent domains, Internet Service Providers that host known malevolent domains, registrars that register known malevolent domains, URLs embedded within a malevolent content item, etc. Upon identification of executable content associated with a domain, the URL of the executable content and the domain are examined to determine if either is known to be associated with harmful, malicious, or unwanted content. If it is known that the URL and/or the domain is associated with harmful, malicious, or unwanted content, the remaining domain contents and any available associated information (e.g., available from a "WHOIS" database, reputation service, or the like) are examined to identify domains, entities, and the like that may have an association therewith (e.g., referencing domains, referenced domains, linking domains, affiliated entities, etc.). Each identified domain, entity, etc. is subsequently examined in a similar manner to identify any potential associations with harmful, malicious, or unwanted content. Suspicious entities, domains, and the like are assigned a suspicion level based upon proximity to the source of the harmful, malicious, or unwanted code. The comparative suspicion levels of a plurality of domains, entities, and the like may be utilized to prioritize further scrutiny and/or relationally mapped to render associations easier to identify.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide systems, methods, and computer-readable media for identifying potentially harmful, malicious, or unwanted content, based upon associations with known offending content and/or offending entities. Such associations may include, without limitation, associations with known malicious binaries, associations with known malevolent domains, associations with individuals and/or entities responsible for the content associated with known malevolent domains, Internet Service Providers that host known malevolent domains, registrars that register known malevolent domains, URLs embedded within a malevolent content item, etc. Upon identifying potentially harmful, malicious, or unwanted content, for instance, upon identifying a binary or other executable content associated with a domain, the URL of the executable content and the domain are examined to determine if either is known to contain or otherwise be associated with harmful, malicious, or unwanted content.

If it is known that the URL and/or the domain contains or is otherwise associated with harmful, malicious, or unwanted content, the remaining domain contents and any available associated information (e.g., information available from a "WHOIS" database, a reputation service, or the like) is examined to identify domains, entities, and the like that may have an association therewith (e.g., referencing domains, referenced domains, linking domains, URLs embedded within a harmful, malicious, or unwanted content item, affiliated entities, etc.). Each identified domain, entity, etc. is subsequently examined in a similar manner to identify any potential associations with the known harmful, malicious, or unwanted content, and so on. Suspicious entities, domains, and the like are assigned a suspicion level based upon proximity to the source of the harmful, malicious, or unwanted content. The comparative suspicion levels of a plurality of domains, entities, and the like may be utilized to prioritize further scrutiny and/or relationally mapped to render associations easier to identify.

Accordingly, in one aspect, the present invention provides one or more computer-readable media having computer-executable instructions embodied thereon that, when executed, perform a method for identifying potentially harmful, malicious, or unwanted content based upon associations with known offending content and/or offending entities. The method includes identifying executable content associated with a domain, at least one of the identified executable content and the associated domain being known to be associated with harmful, malicious, or unwanted content; identifying at least one entity having an identifiable association with the executable content and/or the associated domain; and assigning a suspicion level to the related entity(ies).

In another aspect, the present invention provides a method for identifying potentially harmful, malicious, or unwanted content based upon associations with known offending content and/or offending entities. The method includes identifying executable content associated with a domain; comparing a URL associated with the identified executable content with a list of URLs known to be associated with harmful, malicious, or unwanted content to determine if the URL associated with the identified executable content is known to be associated with harmful, malicious, or unwanted content; comparing the associated domain with a list of domains known to be associated with harmful, malicious, or unwanted content to determine if the associated domain is known to be associated with harmful, malicious, or unwanted content; and indexing the URL associated with the identified executable content and the associated domain in association with the determination whether the identified executable content and/or the associated domain is known to be associated with harmful, malicious, or unwanted content.

In a further aspect, the present invention provides a computerized system for identifying potentially harmful, malicious, or unwanted content based upon associations with known offending content and/or offending entities. The computerized system includes an executable content identifying module configured for identifying executable content associated with a domain, an association identifying module configured to identify at least one entity having an identifiable association with the received executable content and/or the associated domain, and a suspicion level assigning module configured for assigning a suspicion level to the related entity (ies).

Having briefly described an overview of embodiments of the present invention, an exemplary operating environment suitable for implementing the present invention is described below.

Figure 1:
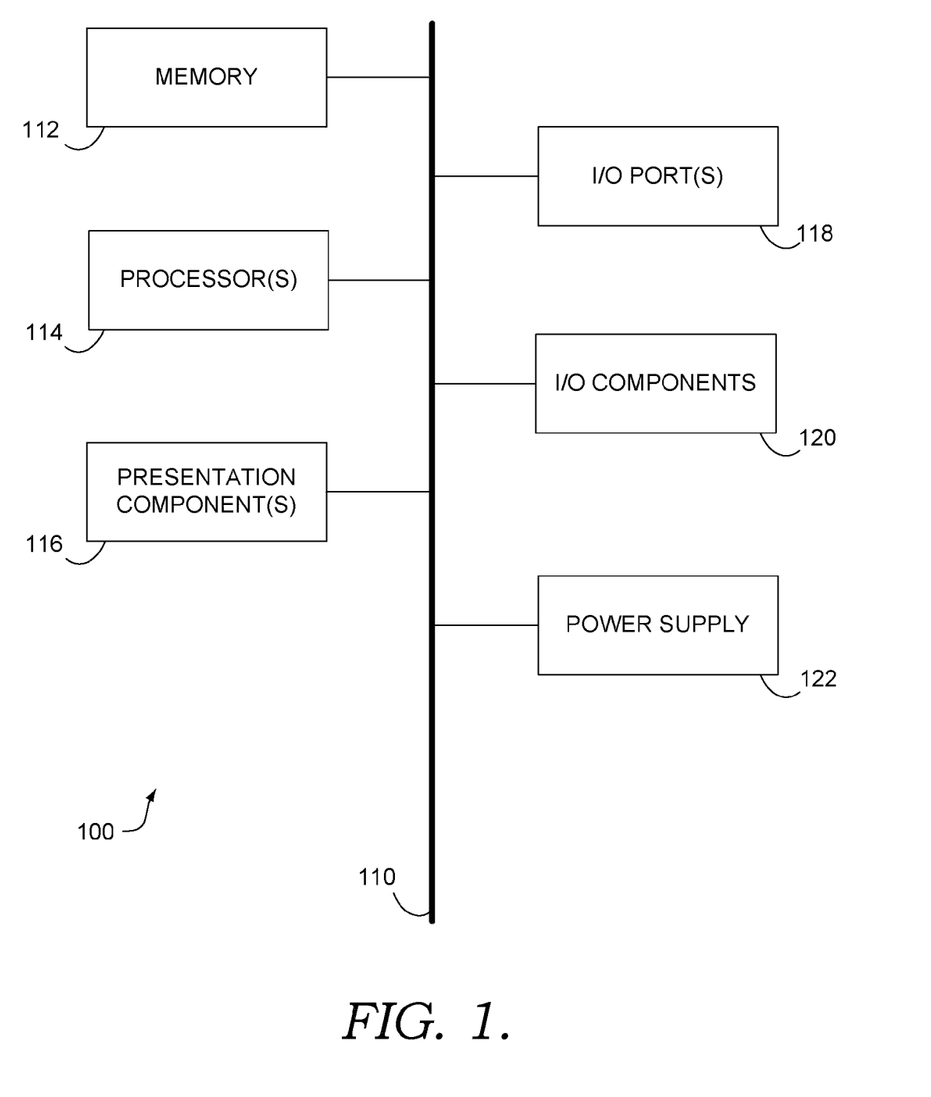
FIG. 1 is a block diagram of an exemplary computing environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

As previously mentioned, in one embodiment, the present invention relates to utilizing associations with known offending content and/or offending entities to identify potentially harmful, malicious, or unwanted content. Such associations may include, without limitation, associations with known malicious binaries, associations with known malevolent domains, associations with individuals and/or entities responsible for the content associated with known malevolent domains, Internet Service Providers that host known malevolent domains, registrars that register known malevolent domains, URLs embedded within malevolent content items, etc. Utilizing the systems and method described herein, a proactive component is introduced into the malware identification process thus increasing the probability that potentially harmful data can be kept from infecting a user's computing device. (It will be understood and appreciated by those of ordinary skill in the art that use of the term "malware," as utilized herein includes not only traditional malicious content (e.g., viruses, worms, and the like) but also spyware, adware, and other potentially harmful or unwanted content (e.g., pornography, violence/hate speech, drugs/alcohol, and the like).)

Figure 2:
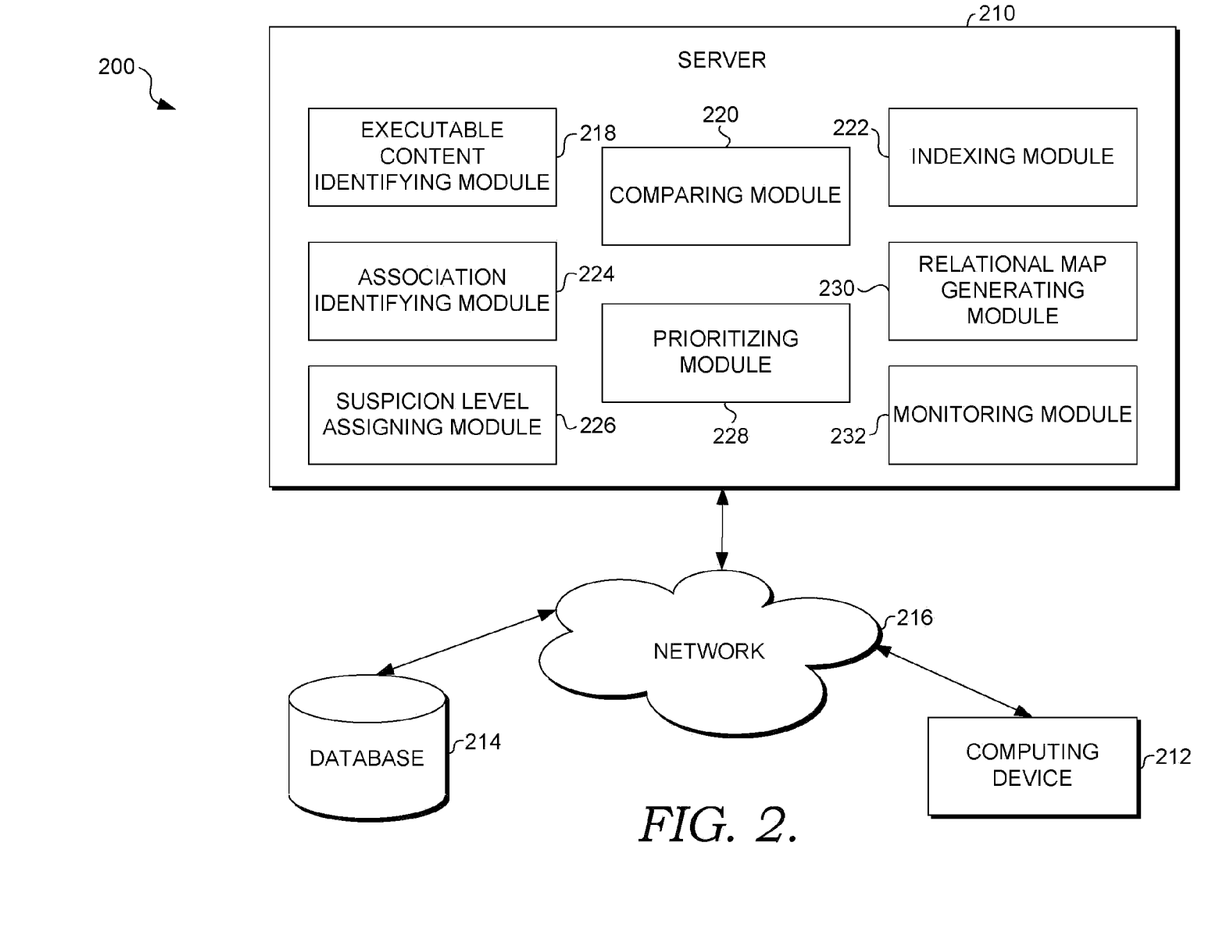
FIG. 2 is a block diagram of an exemplary computing system architecture suitable for use in implementing embodiments of the present invention.

With reference to FIG. 2, a block diagram is illustrated that shows an exemplary computing system architecture 200 configured for identifying potentially harmful, malicious, or unwanted content based upon associations with known offending content and/or offending entities, in accordance with an embodiment of the present invention. It will be understood and appreciated by those of ordinary skill in the art that the computing system architecture 200 shown in FIG. 2 is merely an example of one suitable computing system and is not intended to suggest any limitation as to the scope of use or functionality of the present invention. Neither should the computing system architecture 200 be interpreted as having any dependency or requirement related to any single component/module or combination of components/modules illustrated therein.

Computing system architecture 200 includes a server 210, a computing device 212 and a database 214, all in communication with one another via a network 216. The network 216 may include, without limitation, one or more local area networks (LANs) and/or wide area networks (WANs). Such networking environments are commonplace in offices, enterprise-wide computer networks, intranets and the Internet. Accordingly, the network 216 is not further described herein.

The database 214 is configured to store information associated with content, domains, entities, and the like known to be affiliated with harmful, malicious, or unwanted content and content/domain/entity associations. In various embodiments, such information may include, without limitation, executable content URLs known to be harmful, malicious, or unwanted; identities of malevolent domains and/or entities; suspicion levels; relational maps; and the like. In embodiments, the database 214 is configured to be searchable for one or more of the items stored in association therewith. It will be understood and appreciated by those of ordinary skill in the art that the information stored in the database 214 may be configurable and may include any information relevant to known harmful, malicious, or unwanted content and content/domain/entity associations. The content and volume of such information are not intended to limit the scope of embodiments of the present invention in any way. Further, though illustrated as a single, independent component, the database 214 may, in fact, be a plurality of databases, for instance a database cluster, portions of which may reside on the server 210, the computing device 212, another external computing device (not shown), and/or any combination thereof.

Each of the server 210 and the computing device 212 shown in FIG. 2 may be any type of computing device, such as, for example, computing device 100 described above with reference to FIG. 1. By way of example only and not limitation, each of the server 210 and the computing device 212 may be a personal computer, desktop computer, laptop computer, handheld device, mobile handset, consumer electronic device, or the like. It should be noted, however, that the present invention is not limited to implementation on such computing devices, but may be implemented on any of a variety of different types of computing devices within the scope of embodiments hereof.

As shown in FIG. 2, the server 210 includes an executable content identifying module 218, a comparing module 220, an indexing module 222, an association identifying module 224, a suspicion level assigning module 226, a prioritizing module 228, a relational map generating module 230, and a monitoring module 232. In some embodiments, one or more of the illustrated modules may be implemented as stand-alone applications. In other embodiments, one or more of the illustrated modules may be integrated directly into the operating system of the server 210 or the computing device 212. It will be understood by those of ordinary skill in the art that the modules illustrated in FIG. 2 are exemplary in nature and in number and should not be construed as limiting. Any number of modules may be employed to achieve the desired functionality within the scope of embodiments of the present invention.

The executable content identifying module 218 is configured for identifying binaries and other executable content associated with a domain. Executable content may be identified, for example, in the form of ActiveX controls, executable files (regardless of extension), and the like. For instance, the executable content identifying module 218 may work in cooperation with a search engine to crawl the Internet (or other network) in search of binaries (i.e., file formats for digital data that do not include a sequence of printable characters) and other executable content. Identified executable content may be known with a high probability to contain or otherwise be associated with harmful, malicious, or unwanted content, may be known with a high probability not to contain or otherwise be associated with harmful, malicious, or unwanted content, or may be unknown or neutral to the system 200.

In embodiments, once identified, the executable content identifying module 218 may transmit a URL associated with the received executable content (but not the actual binary), and any associated information for storage, for instance, in association with database 214. Associated information may include, by way of example only, the hosting domain, one or more domains referenced in the content surrounding the executable content, identity information (for instance, information associated with a "WHOIS" database, reputation service, or the like) associated with the hosting domain or a referenced domain, or the like. Any information that may be viewed as of assistance in determining whether the identified executable content may contain or otherwise be associated with harmful, malicious, or unwanted content may be considered "identifying information" within the context hereof.

The comparing module 220 is configured for comparing the URL associated with the received executable content with a list of URLs known to contain or otherwise be associated with harmful, malicious, or unwanted content to determine if the URL is known to be malevolent. The comparing module is further configured for comparing the hosting domain, any referenced domains, and any other associated domains with a list of domains known to be associated with harmful, malicious, or unwanted content to determine if any of the associated domains (or entities having an association therewith) is known to be malevolent. In one embodiment, the comparing module 220 queries the database 214 for URLs, domains, and the like that are stored in association therewith that are known with a high probability to be associated with harmful, malicious, or unwanted content and/or URLs, domains and the like that are known with a high probability not to be associated with harmful, malicious, or unwanted content. Embodiments of the present invention, however, are not limited to database query operations but may employ any known methods for accessing information relevant to a particular criterion for comparison known to those of ordinary skill in the art.

The indexing module 228 is configured for indexing the URL associated with the executable content, the hosting domain, any referenced domains, any other associated domains, and the outcome of the comparing module 220 (that is, an indication whether or not the executable content and/or any of the associated domains or entities is known to be malevolent) in association with one another. The indexed information may then be stored, for instance, in association with the database 214.

The association identifying module 224 is configured for identifying entities (e.g., domains, affiliates, etc.) having identifiable associations with a known or suspected harmful or malevolent entity and/or known or suspected harmful, malicious, or unwanted content. For instance, the association identifying module 224 may identify an entity known to reference harmful, malicious, or unwanted content that references the identified binary and/or hosting domain. Or, the association identifying module 224 may identify an entity having an operator with similar or identical identifying information to the hosting domain, the operator being known to be associated with harmful, malicious, or unwanted content. Or, if the executable content identified by the executable content identifying module 218 is known to contain harmful, malicious, or unwanted content, the association module 224 may identify an entity referenced in the content surrounding the identified executable content. It will be understood and appreciated by those of ordinary skill in the art that the above-described related entities are provided by way of example only and are not intended to limit the scope of embodiments of the present invention in any way. Any entity having an identifiable relationship to executable content identified by the executable content identifying module, any entity having an identifiable relationship to a domain or entity associated with identified executable content, any entity having an identifiable relationship to a domain or entity associated with another domain or entity associated with identified executable content, and/or any combination thereof may be identified as a related entity within the scope hereof.

By way of example only, and not limitation, identifiable associations may include an association between at least two of the executable content, an originating domain, a web page associated with the originating domain, an operator associated with the originating domain, a referencing domain, a web page associated with the referencing domain, an operator associated with the referencing domain, a referenced domain, a web page associated with the referenced domain, an operator associated with the referenced domain, a hosting domain, a web page associated with the hosting domain, an operator associated with the hosting domain, a linking domain, a web page associated with the linking domain, an operator associated with the linking domain, and a domain embedded in a harmful, malicious, or unwanted content item.

The suspicion level assigning module 226 is configured for assigning a suspicion level to any executable content identified by the executable content identifying module 218 and/or any related entities identified by the related entity identifying module 224, including the hosting entity. Suspicion levels are typically assigned based upon the proximity of the identified content/entity to the source of known harmful, malicious, or unwanted content. For instance, with reference to FIG. 3, if harmful, malicious, or unwanted executable content is identified on a web site (e.g., malware.com) hosted by entity X; entity Y is referenced in the content surrounding the executable content on the web site hosted by entity X (malware.com); and entity Z hosts a web site (Bundler.com) referencing entity Y; each of entities X, Y, and Z can be said to have an identifiable relationship with the known harmful, malicious, or unwanted content. (For purposes of this example, assume no identifiable associations exist between entities X, Y, and Z other than those illustrated in FIG. 3.) However, as entity X is hosting the known malicious content (e.g., on malware.com), entity X is likely to have a high suspicion level. Other web sites hosted by entity X (e.g., A.com, B.com, and C.com) are likely to also have a high suspicion level, although the suspicion level associated with such sites may be slightly lower than the suspicion level associated with entity X as they are effectively one step removed from the harmful, malicious, or unwanted content. Entity Y, two steps removed from the malicious content, is likely to have a slightly lower suspicion level that the other web sites hosted by entity X as entity Y's relationship with the harmful, malicious, or unwanted content may be simple happenstance. Finally, entity Z, being three steps removed from the harmful, malicious, or unwanted content, will have comparatively the lowest suspicion level of the entities considered in this example.

With reference back to FIG. 2, the prioritizing module 228 is configured for utilizing the comparative suspicion levels of a plurality of entities and/or executable content to prioritize examination of the entities/content relative to one another. That is, in the above example, entity X will likely be examined first, other web sites hosted by entity X (e.g., A.com, B.com, and C.com) will be examined next, then entity Y will be examined, and entity Z will be examined last. It will be understood by those of ordinary skill in the art that in practical application, thousands (if not tens of thousands) of entities/content will be identified utilizing system 200 each day. Accordingly, prioritizing the identified entities/content based upon a pre-assessed risk greatly increases the likelihood that potentially harmful, malicious, or unwanted content will be blocked before it causes actual harm to a computing device, e.g., computing device 212.

The relational map generating module 230 is another tool provided by the system 200 that facilitates rapid identification of entities/content that may be harmful, malicious, or unwanted based upon associations. The relational map generating module 230 is configured for mining stored data, for instance, data stored in database 214, and generating a relational or topographical map illustrating potentially harmful, malevolent, or unwanted entities/content in relation to known harmful, malevolent, or unwanted entities/content. Such a relational map may be generated prior to suspicion levels being assigned to the entities/content, may be generated utilizing the assigned suspicion levels, and/or may be used independent of the suspicion level assigning module. Any and all such variations are contemplated to be within the scope of embodiments hereof.

Turning again to FIG. 3, a schematic diagram is shown illustrating an exemplary relational (topographical) map 300, in accordance with an embodiment of the present invention. It will be understood and appreciated by those of ordinary skill in the art that the illustrated relational map 300 is exemplary in nature and is not intended to limit the scope of embodiments of the present invention in any way. Any manner of organizing the information, e.g., by way of a visual mapping, a data structure, or the like, may be utilized to render relationships among domains/entities easier to identify. Any and all methods and representations, and any combination thereof, are contemplated to be within the scope of embodiments hereof.

Figure 3:
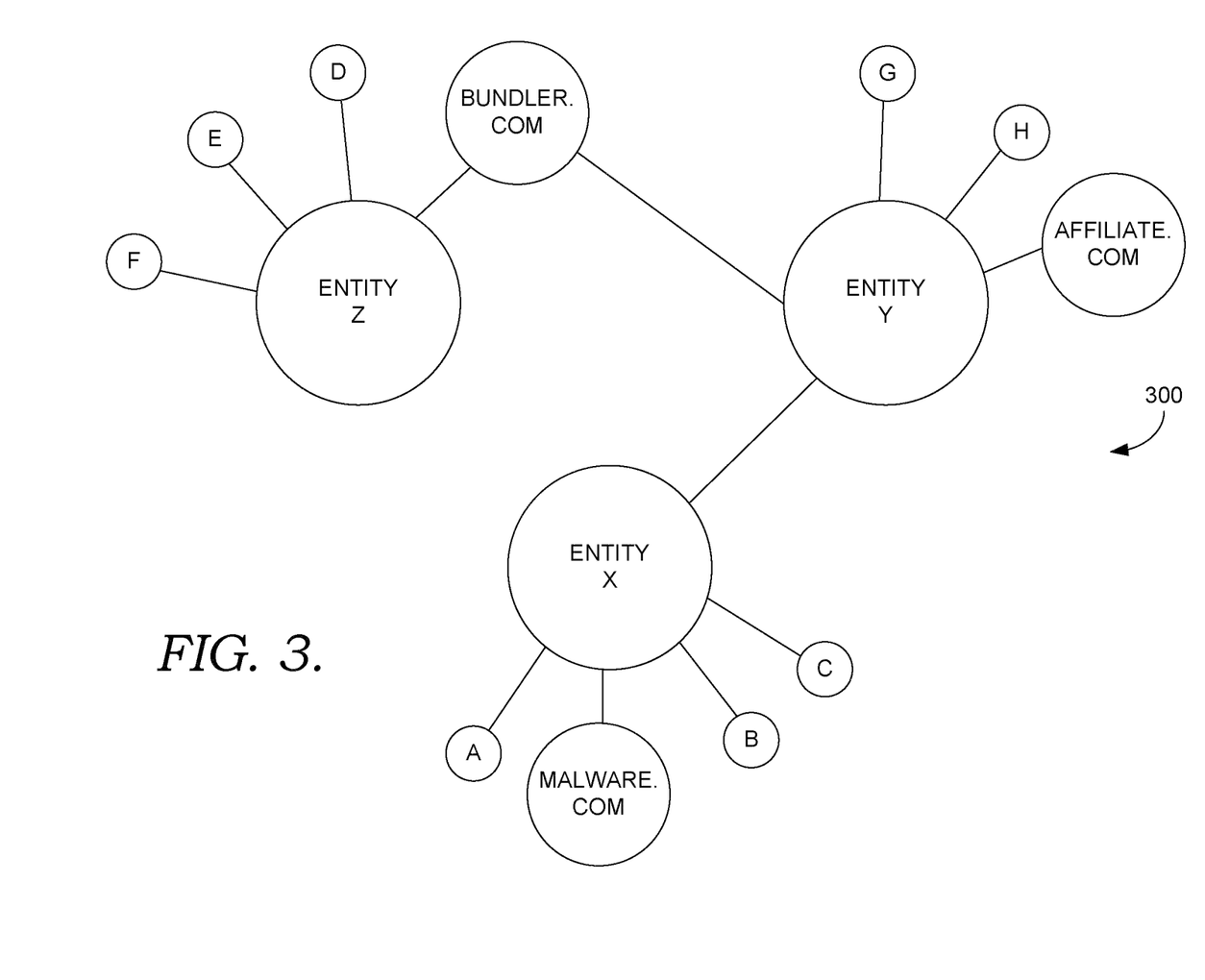
FIG. 3 is a schematic diagram illustrating an exemplary relational map, in accordance with an embodiment of the present invention.

Relational map 300 illustrates a known malevolent web site, or source element, identified as Malware.com. Entity X is known to host Malware.com as well as three other web sites, A.com, B.com, and C.com. Additionally, Affiliate.com and Bundler.com have been determined to have identifiable relationships with malware.com through affiliations with the entity hosting Affiliate.com (i.e., entity Y). For instance, entity X and entity Y may be under common ownership and Bundler.com may be referred to on Affiliate.com. Entity Z is known to host three separate websites, D.com, E.com, and F.com, as well as Bundler.com. In addition to Affiliate.com, entity Y is known to host two other websites, G.com and H.com.

As can be seen from relational map 300, such a relational representation of associated entities/content makes identifying those entities having a more direct relationship to the known malevolent site (that is, websites A.com, B.com, and C.com) versus those having a more indirect relationship to malware.com (e.g., websites D.com, E.com, F.com, G.com and H.com) easier to identify. Such information may then be utilized, for instance, by prioritizing module 228, to prioritize examination of the illustrated entities with respect to one another. Additionally, in accordance with embodiments of the present invention, analysis of the referring domain topology can take place by examining the geographic location of the machines, the hosting company identities, and the like, and may be used to identify central hosting nodes of harmful, malicious, or unwanted content being referred to by multiple domains which could then be the target of additional examination.

Turning back to FIG. 2, the monitoring module 232 is configured for monitoring known offending domains and/or offending entities to identify changes in the binaries or other executable code associated therewith. For instance, referring back to FIG. 3, as Malware.com is known to host harmful, malicious, or unwanted content, any changes to that content should be identified as quickly as possible so that updated blocks of the information may be quickly put into place before any modified harmful, malicious, or unwanted content has a chance to cause harm (or, at least, to mitigate any harm caused). The monitoring module 232 is not limited to monitoring content/entities/domains known to be associated with harmful, malicious, or unwanted content, however. If desired, changes to any indexed entity/domain/content, whether known to be associated with harmful, malicious, or unwanted content or not, may be monitored for changes so that such changes can be evaluated and examination thereof prioritized in accordance with embodiments hereof. Any and all such variations, and any combination thereof, are contemplated to be within the scope of embodiments of the present invention.

Figure 4:
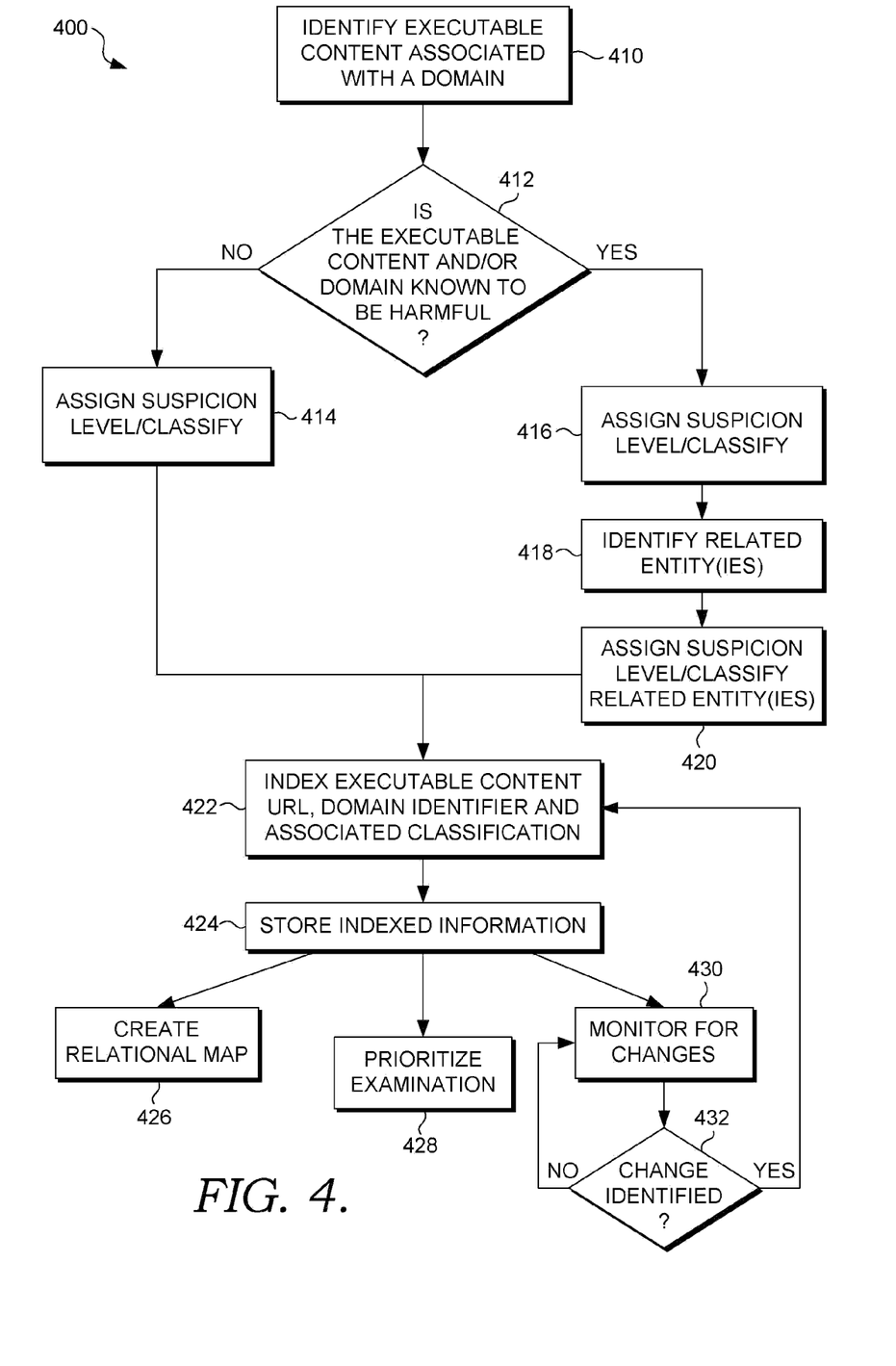
FIG. 4 is a flow diagram showing a method for identifying potentially harmful, malicious, or unwanted content based upon associations with known offending content and/or offending entities, in accordance with an embodiment of the present invention.

With reference now to FIG. 4, a flow diagram is shown illustrating a method 400 for identifying potentially harmful, malicious, or unwanted code based upon associations with known offending code and/or entities, in accordance with an embodiment of the present invention. Initially, as indicated at block 410, executable content associated with a domain is identified, for instance, utilizing executable content identifying module 218 of FIG. 2. Subsequently, it is determined whether the identified executable content and/or the associated domain are known to contain or otherwise be associated with harmful, malicious, and/or unwanted content, e.g., utilizing comparing module 220 to compare the content/domain to known harmful, malicious, or unwanted content/domains. This is indicated at block 412. If it is determined that neither the executable content nor the associated domain are known to contain or otherwise be associated with harmful, malicious, or unwanted content, a suspicion level/classification may be assigned to the executable content and/or the associated domain, for instance, utilizing suspicion level assigning module 226 of FIG. 2. This is indicated at block 414.

If, however, it is determined at block 412 that one or both of the identified executable content and the associated domain are known to contain or otherwise be associated with harmful, malicious, or unwanted content, a suspicion level/classification is assigned to the content and/or domain, as indicated at block 416, and any related content and/or entities are identified, for instance, utilizing association identifying module 224 of FIG. 2. This is indicated at block 418. Each associated entity or content item is subsequently assigned a suspicion level/classification, for instance, utilizing suspicion level assigning module 226, as indicated at block 420.

Subsequently, a URL associated with the executable content, an identifier associated with the hosting domain, any other related content and/or entities, and/or the assigned classification(s) may be indexed, for instance, utilizing indexing module 222 of FIG. 2, as indicated at block 422. The indexed information is subsequently stored, e.g., in database 214 of FIG. 2, as indicated at block 424.

Once stored, the indexed information may be utilized for a number of related purposes. For instance, the indexed information may be utilized to create a relational map (e.g., utilizing relational map generating module 230 of FIG. 2) to make quickly identifying the most potentially harmful, malicious, and/or unwanted entities/domains/content easier, as indicated at block 426. The indexed information may also (or alternatively) be used to prioritize examination of entities/domains/content, e.g., utilizing prioritizing module 228 of FIG. 2, as indicated at block 428. Still further, the indexed information may also (or alternatively) be utilized to monitor indexed entities/domains/content (for instance, utilizing monitoring module 232 of FIG. 2) to identify any changes thereto, as indicated at block 430. If a change is identified, as indicated at block 432, the changed entity/domain/content may be indexed, as indicated at block 422 and all, or part, of the process repeated therefore.

It will be understood and appreciated by those of ordinary skill in the art that the method 400 illustrated in FIG. 4 is merely exemplary and is not intended to limit the scope of embodiments of the present invention in any way. Various illustrated steps may be performed in an order other than the order illustrated (e.g., a relational map may be generated prior to the assigning of suspicion levels) and/or illustrated steps may be removed from the method (e.g., only one of a relational map and/or assigned suspicion levels may be desired). Additionally, steps may be added to the illustrated method 400 as desired. For instance, early on in the analysis of identified domains/content, queues for "likely good" and "likely bad" could be created based upon a combination of factors such as age of the hosting domain, key terms in the file names, reputation of the hosting domain based on previously identified executable content, clear associations of the hosting domain to a commercial entity and details of that commercial entity (number of employees, annual revenue, publicly traded stock history, etc.). Identified "good" files help to prevent false positives and, accordingly, represent a valuable analysis target as well. Any and all such variations, and any combination thereof, are contemplated to be within the scope of embodiments of the present invention.

The information gleaned through the method 400 (and/or any variations thereof) may be useful in a variety of settings. For instance, not only can the method aid in more rapid identification of potentially harmful, malicious, or unwanted code than current anti-malware solutions, such information may also be utilized for reputational analysis of domains and other entities. This may be useful as network users are becoming increasingly comfortable relying on reputations articulated by trusted sources.

As can be understood, embodiments of the present invention provide systems, methods, and computer-readable media for identifying potentially harmful, malicious, or unwanted content based upon associations with known offending content and/or entities. Upon identifying executable content associated with a domain, the URL of the executable content and the domain are examined to determine if either is known to be associated with harmful, malicious, and/or unwanted content. If it is known that the URL and/or the domain is associated with harmful, malicious, or unwanted content, the remaining domain contents and any available associated information (e.g., information available from a "WHOIS" database, reputation service, or the like) is examined to identify domains, entities, and the like that may have an association therewith (e.g., referencing domains, referenced domains, linking domains, affiliated entities, etc.). Each identified domain, affiliate, etc. is subsequently examined in a similar manner to identify any potential associations with harmful, malicious, or unwanted code. Suspicious entities, domains, and the like are assigned a suspicion level based upon proximity to the source of the harmful, malicious, or unwanted code. The comparative suspicion levels of a plurality of domains, entities, and the like may be utilized to prioritize further scrutiny and/or relationally mapped to render associations easier to identify.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A computing device having computer-executable instructions embodied thereon that, when executed, perform a method for identifying potentially harmful, malicious, or unwanted content based upon entity associations, the method comprising:
   identifying executable content associated with a domain the identified executable content is known to be associated with harmful, malicious, or unwanted content;
   identifying one or more entities associated with the executable content for classification, wherein identifying the one or more entities for classification comprises:
   (1) identifying a first entity that hosts the identified executable content;
   (2) assigning a first suspicion level to the first entity;
   (3) identifying a second entity that is referenced in content surrounding the identified executable content that is hosted by the first entity; and
   (4) assigning a second suspicion level to the second entity, the second suspicion level indicating a lesser suspicion than the first suspicion level;
   mapping a relationship of the second entity to the first entity on a relational map;
   utilizing comparative suspicion levels of the first and second entities to prioritize examination, wherein the comparative suspicion levels represent a proximity to the identified executable content, wherein prioritizing examination comprises:
   (1) comparing the assigned suspicion level of the first entity with the assigned suspicion level of the second entity; and
   (2) prioritizing the first entity for examination over the second entity when the second level of suspicion is lesser than the first level of suspicion;
   monitoring the associated domain for a change in executable content associated therewith;
   identifying at least one characteristic associated with the change in the executable content based on monitoring the associated domain; and
   indexing the at least one identifying characteristic associated with the change in the executable content in association with the executable content.

2. The computing device of claim 1, wherein the method further comprises:
   identifying a third entity that hosts content that references the second entity;
   assigning a third suspicion level to the third entity, the third suspicion level indicating a lesser suspicion than the second suspicion level;
   updating the relational map in accordance with the relationship of the third entity to the first entity and the second entity;
   comparing the assigned suspicion level of the second entity with the assigned suspicion level of the third entity; and
   utilizing the comparative suspicion levels of the second and third entities to prioritize examination of the second entity over the third entity.

3. The computing device of claim 2, wherein the relational map includes a source element depicting the first entity, and wherein the suspicion levels associated with the second entity and the third entity are indicative of their respective proximity to the source element.

4. The computing device of claim 1, wherein each assigned suspicion level is utilized for reputation analysis.

5. A method for identifying potentially harmful, malicious or unwanted content based upon entity associations, the method comprising:
   identifying executable content associated with a domain;
   comparing a URL associated with the identified executable content with a list of URLs known to be associated with harmful, malicious, or unwanted content to determine if the URL associated with the identified executable content is known to be associated with harmful, malicious, or unwanted content;
   comparing the associated domain with a list of domains known to be associated with harmful, malicious, or unwanted content to determine if the associated domain is known to be associated with harmful, malicious, or unwanted content;
   determining a plurality of entities having an identifiable association with the URL associated with the identified executable content;

assigning a suspicion level to each entity in the plurality of entities,
wherein the Suspicion level is based on the proximity of each entity to the identified executable content such that the suspicion level decreases the more removed the entity is from the identified executable content;
    indexing the URL associated with the identified executable content and the associated domain in association with the determination whether the identified executable content and the associated domain is known to be associated with harmful, malicious, or unwanted content;
    mining the at least one database to create a relational map illustrating a proximity of the associated domain to at least one other domain or entity monitoring the associated domain and the at least one other domain for changes in executable content associated therewith; and
    upon identifying a change in executable content associated with the associated domain and the at least one other domain based on monitoring:
        (1) identifying a URL associated with the change in the executable content;
        (2) identifying at least one identifying characteristic associated with the change in the executable content; and
        (3) indexing the identified URL in association with the at least one identifying characteristic and a corresponding hosting site.

6. The method of claim 5, wherein if it is determined that the URL associated with the identified executable content is known to be associated with harmful, malicious, or unwanted content, the method further comprises:
    utilizing the suspicion levels of each entity in the plurality of entities to prioritize examination of a first entity over a second entity.

7. The method of claim 5, further comprising storing the indexed URL, the associated domain and the determination in association with at least one database.

8. The method of claim 5, further comprising updating the relational map in accordance with the identified URL and associated identifying characteristic and corresponding hosting site.

9. A computerized system for identifying potentially harmful, malicious, or unwanted content based upon associations, the system comprising:
    a computing device having one or more processors and one or more computer-readable storage media having computer-executable modules embodied thereon that, when executed, cause the computing device to:
        identify executable content associated with a domain;
        identify a plurality of entities having an identifiable association with at least one of the received executable content and the associated domain, wherein the at least one of the received executable content and the associated domain are known to be associated with harmful, malicious, or unwanted content;
        assign a suspicion level to each entity of the plurality of entities based upon proximity of each entity of the plurality of entities to a source of the known harmful, malicious, or unwanted content;
        utilize comparative suspicion levels to prioritize examination of each of the plurality of entities relative to one another wherein prioritizing examination of the plurality of entities comprises:
            (1) comparing the assigned suspicion level of the plurality of entities;
            (2) prioritizing a first entity for examination over a second entity when the level of suspicion of the second entity is lesser than the level of suspicion of the first entity;
        generate a relational map illustrating associations among a plurality of entities, at least one of the plurality of entities being known to be associated with harmful, malicious, or unwanted content;
        monitoring the associated domain for changes in executable content associated therewith; and
    upon identifying a change in the executable content associated with the associated domain based on monitoring:
        (1) identifying at least one identifying characteristic associated with the changed executable content; and
        (2) indexing the plurality of entities in association with the at least one identifying characteristic.

10. The computerized system of claim 9, wherein the computing device compares a URL associated with the identified executable content with a list of URLs known to be associated with harmful, malicious, or unwanted content to determine if the URL associated with the identified executable content is known to be associated with harmful, malicious, or unwanted content, and compares the associated domain with a list of domains known to be associated with harmful, malicious, or unwanted content to determine if the associated domain is known to be associated with harmful, malicious, or unwanted content.

11. The computerized system of claim 9, wherein the computing device further indexes the URL associated with the identified executable content and the associated domain in association with the determination whether the identified executable content and the associated domain is known to be associated with harmful, malicious, or unwanted content.

12. The computerized system of claim 9, wherein the identifiable association comprises an association between at least two of the executable content, an originating domain, a web page associated with the originating domain, an operator associated with the originating domain, a referencing domain, a web page associated with the referencing domain, an operator associated with the referencing domain, a referenced domain, a web page associated with the referenced domain, an operator associated with the referenced domain, a hosting domain, a web page associated with the hosting domain, an operator associated with the hosting domain, a linking domain, a web page associated with the linking domain, an operator associated with the linking domain, and a domain embedded within a harmful, malicious, or unwanted content item.

* * * * *